United States Patent
Yu et al.

(10) Patent No.: US 11,277,771 B2
(45) Date of Patent: Mar. 15, 2022

(54) SOFTWARE DEFINED CELLULAR SYSTEM WITH DISTRIBUTED ANTENNAS

(71) Applicant: Apple Inc., Cupertino, CA (US)

(72) Inventors: Yifan Yu, Beijing (CN); Sunny Zhang, Beijing (CN); Guangjie Li, Beijing (CN)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/552,897

(22) Filed: Aug. 27, 2019

(65) Prior Publication Data

US 2020/0059828 A1 Feb. 20, 2020

Related U.S. Application Data

(63) Continuation of application No. 14/971,915, filed on Dec. 16, 2015, now Pat. No. 10,448,282.

(30) Foreign Application Priority Data

Apr. 27, 2015 (WO) ................ PCT/CN2015/077529

(51) Int. Cl.
  *H04W 28/16* (2009.01)
  *H01Q 21/28* (2006.01)
  *H04B 7/04* (2017.01)
  *H04B 7/06* (2006.01)

(52) U.S. Cl.
  CPC ............ *H04W 28/16* (2013.01); *H01Q 21/28* (2013.01); *H04B 7/061* (2013.01)

(58) Field of Classification Search
  CPC ........ H04W 28/16; H01Q 21/28; H04B 7/061
  See application file for complete search history.

(56) References Cited

U.S. PATENT DOCUMENTS

| 10,448,282 B2 | 10/2019 | Yu et al. | |
| 2007/0173243 A1 | 7/2007 | Li | |
| 2008/0204338 A1 | 8/2008 | Rofougaran | |
| 2012/0314665 A1* | 12/2012 | Ishida .................... | H01Q 1/246 370/329 |
| 2013/0077580 A1 | 3/2013 | Kang et al. | |
| 2013/0114963 A1* | 5/2013 | Stapleton .............. | H04W 24/02 398/115 |
| 2013/0137486 A1 | 5/2013 | Riedel et al. | |
| 2013/0142054 A1* | 6/2013 | Ahmadi ................ | H04B 7/024 370/252 |
| 2013/0170574 A1* | 7/2013 | Fleming ................ | H04B 7/024 375/267 |

(Continued)

OTHER PUBLICATIONS

Perlman et al., "pCell Wireless Reinvented—An Introduction to pCell," White Paper, Artemis Networks LLC, Feb. 2015, 99 pages.

*Primary Examiner* — Luat Phung
(74) *Attorney, Agent, or Firm* — Fish & Richardson P.C.

(57) ABSTRACT

Embodiments describe methods and apparatuses for a software-defined cellular system with distributed antennas and baseband units (BBUs). The BBUs may be implemented with software defined network (SDN) technology in some embodiments. Embodiments include provision of a dynamic connection between distributed antennas and a BBU to serve a scheduled UE. In some embodiments, a BBU may select a scheduling set of antennas that may provide a desired connection with the UE. Other embodiments may be described and/or claimed.

23 Claims, 7 Drawing Sheets

(56) References Cited

U.S. PATENT DOCUMENTS

| | | | |
|---|---|---|---|
| 2013/0172050 A1* | 7/2013 | Fleming | H04B 7/0874 |
| | | | 455/562.1 |
| 2014/0161447 A1* | 6/2014 | Graves | H04Q 11/0062 |
| | | | 398/48 |
| 2014/0213310 A1 | 7/2014 | Yeh et al. | |
| 2016/0029205 A1* | 1/2016 | Sirotkin | H04W 16/02 |
| | | | 455/418 |
| 2016/0270006 A1* | 9/2016 | Choi | H04W 52/365 |
| 2016/0295572 A1* | 10/2016 | Hahn | H04W 72/0413 |
| 2016/0316396 A1 | 10/2016 | Yu et al. | |
| 2018/0220331 A1* | 8/2018 | Wang | H04W 28/0226 |

\* cited by examiner

SOFTWARE DEFINED CELLULAR SYSTEM WITH DISTRIBUTED ANTENNAS

CROSS REFERENCE TO RELATED APPLICATIONS

The present application is a continuation of U.S. patent application Ser. No. 14/971,915, filed Dec. 16, 2015, entitled "SOFTWARE DEFINED CELLULAR SYSTEM WITH DISTRIBUTED ANTENNAS," which claims priority under 35 U.S.C. § 119(a) to International Application No. PCT/CN2015/077529 filed Apr. 27, 2015 and entitled "The Software Defined Cellular System Built with Distributed Antennas," the disclosures of which are incorporated herein by reference in their entireties.

FIELD

Embodiments of the present disclosure generally relate to the field of wireless communication, and more particularly, to apparatuses and methods for a software-defined cellular system with distributed antennas.

BACKGROUND

Cellular systems are relied upon to provide consistent and comprehensive radio access coverage to a large number of user equipments (UEs). Challenges to providing such coverage increase with the number, distribution, and mobility of the UEs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Embodiments of the present disclosure describe a cellular system that may be composed of distributed antennas and baseband units (BBUs). The BBUs may be implemented with software defined network (SDN) technology in some embodiments. Such a cellular system may enable improved radio access coverage for UEs coupled with the cellular system. As will be described, embodiments include provision of a dynamic connection between distributed antennas and a BBU to serve a scheduled UE. In some embodiments, a BBU may select a scheduling set of antennas that may provide a desired connection with the UE. In some embodiments, the antennas of the scheduling set may be selected so that the UE is in the center of a cell, or in some other relationship with the antennas that provides a desirable connection.

As used herein, a "connection" refers to a signaling connection between two elements. The signaling connection may, and often will, traverse through one or more intermediate elements such as switches. The signaling connection may be over wired or wireless communication media. The signaling connection may be dynamically configurable by appropriate configuration of the switches as will be described in further detail herein.

Figure 1:
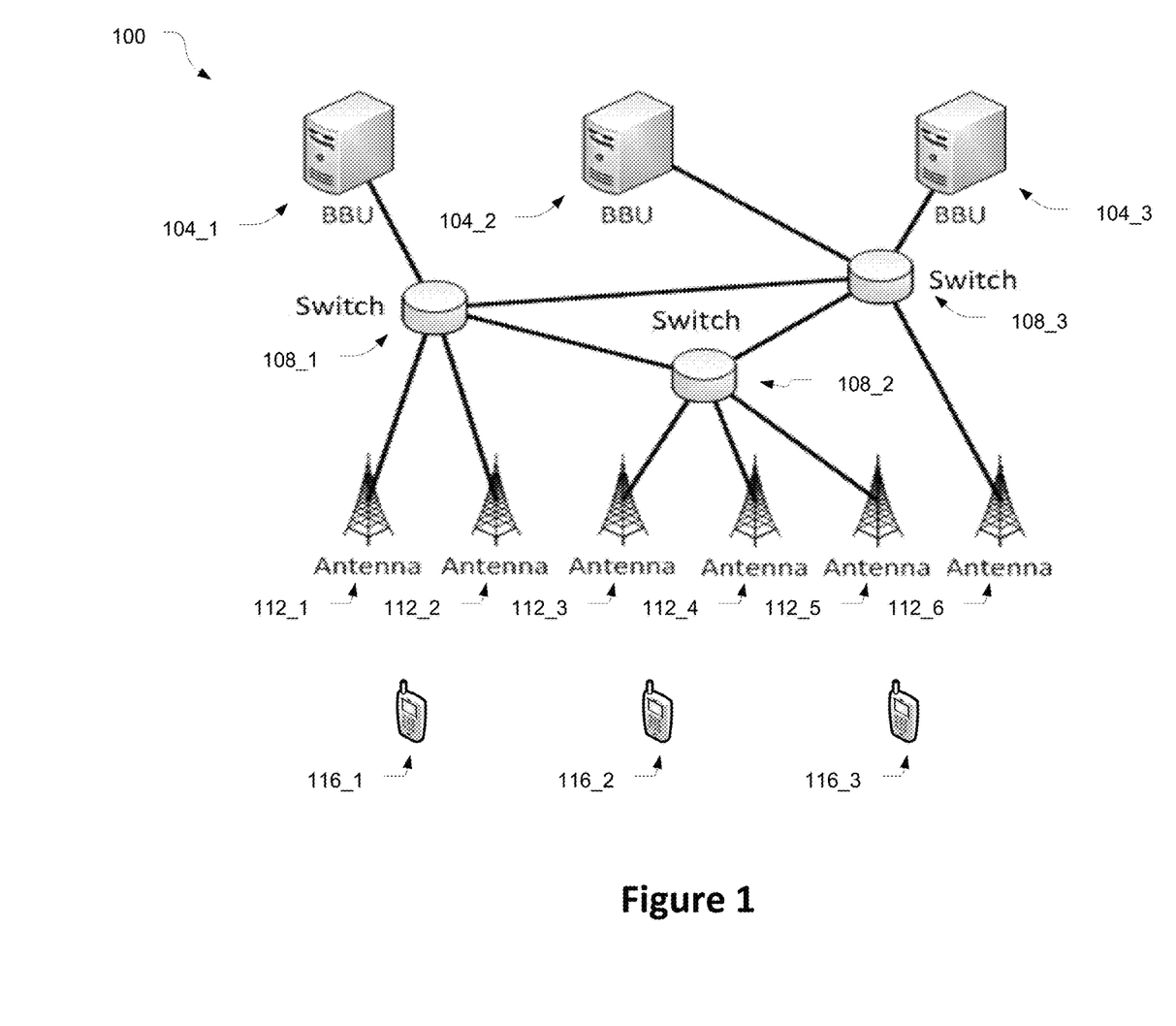
FIG. 1 schematically illustrates a wireless communication system in accordance with various embodiments.

FIG. 1 schematically illustrates a wireless communication system 100 in accordance with various embodiments. The wireless communication system 100 (or simply "system 100") may be included in, or otherwise be part of, a cellular mobile network. The system 100, or components thereof, may be disposed in a radio access network (RAN) or an evolved packet core (EPC) of the cellular mobile network. In various embodiments, the cellular mobile network may be a Global System for Mobile Communication (GSM), General Packet Radio Service (GPRS), Universal Mobile Telecommunications System (UMTS), High Speed Packet Access (HSPA), Evolved HSPA (E-HSPA), Long-Term Evolution (LTE), or LTE-Advanced (LTE-A) network. The system 100 may operate in accordance with other network technologies in other embodiments.

The system 100 may include BBUs 104, switches 108, and antennas 112 that are designed, as described herein, to provide desired radio access coverage to UEs 116. Each of the BBUs 104 may be capable of coupling with each of the antennas 112 through one or more of the switches 108. For example, BBU 104_1 may be connected with: antennas 112_1 and 112_2 through switch 108_1; antennas 112_3, 112_4, and 112_5 through switches 108_1 and 108_2; and antenna 112_6 through switches 108_1 and 108_3. BBU 104_2 may be connected with: antennas 112_1 and 112_2 through switches 108_3 and 108_1; antennas 112_3, 112_4, and 112_5 through switches 108_3 and 108_2; and antenna 112_6 through switch 108_3. And BBU 104_3 may be connected with: antennas 112_1 and 112_2 through switches 108_3 and 108_1; antennas 112_3, 112_4, and 112_5 through switches 108_3 and 108_2; and antenna 112_6 through switch 108_3. The connection topology illustrated in FIG. 1 is merely an example. Other embodiments may have other connection topologies.

The BBUs 104 may control the switches 108 to establish or release connections with one or more of the antennas 112 to provide desired radio access coverage for the UEs 116. A BBU may also exchange coordination and feedback messages with other BBUs through the switches 108.

While the UEs 116 are generally shown as smart phones in FIG. 1, other embodiments may include other types of UEs including, but not limited to, a sensor device, a personal computer (PC), a notebook, an ultrabook, a netbook, an ultra mobile PC (UMPC), a handheld mobile device, a UICC, a personal digital assistant (PDA), a Customer Premise Equipment (CPE), a tablet computing device, or other consumer electronics such as MP3 players, digital cameras, and the like.

Figure 2:
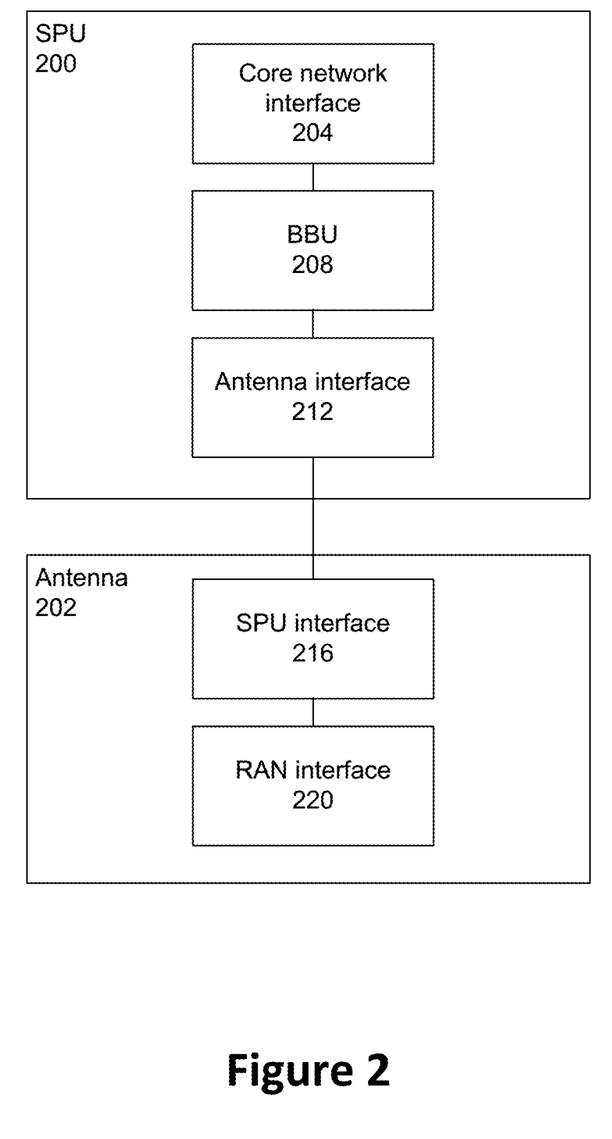
FIG. 2 is a schematic block diagram illustrating a signal processing unit and an antenna in accordance with various embodiments.

FIG. 2 illustrates a signal processing unit 200 and an antenna 202 in accordance with some embodiments. The signal processing unit (SPU) 200 and antenna at 202 may each include or be included in an electronic device.

The SPU 200 may include core network interface 204 coupled with a BBU 208. The BBU 208 may be similar to, and substantially interchangeable with, any of the BBUs 104 of FIG. 1. The BBU 208 may be further coupled with an antenna interface 212.

In general, the core network interface 204 may be configured to transmit/receive signals to/from one or more network components such as, but not limited to, a radio network controller of the cellular mobile network. The signals may be conveyed over Ethernet or other computer networking technologies using a variety of physical media interfaces such as, but not limited to, coaxial, twisted-paired, and fiber-optic media interfaces.

The antenna interface 212 may be configured to transmit/receive signals to/from antenna 202, which may be similar to, and substantially interchangeable with, any one of antennas 112 of FIG. 1. The signals may be communicated via switches, for example, switches 108, over Ethernet or other computer networking technologies using a variety of physical media interfaces such as, but not limited to, coaxial, twisted-paired, and fiber-optic media interfaces.

The antenna 202 may include an SPU interface 216 coupled with a RAN interface 220. In general, the SPU interface 216 may be configured to transmit/receive signals to/from the antenna interface 212. The RAN interface 220 may be configured to transmit/receive signals to/from the UEs, for example, UEs 116 of FIG. 1. In various embodiments, the RAN interface 220 may transmit/receive signals to/from the UEs by a standardized air interface such as, but not limited to, an evolved universal terrestrial radio access network (EUTRAN) interface that is compatible with 3GPP Technical Specifications.

In some embodiments, the interfaces of FIG. 2 may be additionally or alternatively referred to as, or implemented in, transceiver circuitry, transmit/receive circuitry, etc.

The BBU 208 may be configured for various signal processing operations such as, but not limited to, modulation/demodulation, encoding/decoding, error correction, scheduling, etc. The BBU 208 may include a software defined radio (SDR) that is capable of being dynamically configured to process radio communications of a variety of frequencies or protocols.

In the uplink direction, the RAN interface 220 may receive signals from the UEs over the air interface. The RAN interface 220 may perform various uplink front-end processing operations to facilitate subsequent baseband processing. These uplink front-end processing operations may include, but are not limited to, conversions (for example, analog-to-digital conversion, downconversion, etc.) amplification (for example, low-noise amplification), filtering, etc. The processed signals may be provided to the SPU interface 216 for transmission to the SPU 200.

The BBU 208 may receive signals from the antenna 202, via the antenna interface 212, and process the signals for transmission to components in the core network, via the core network interface 204. In the downlink direction, the BBU 208 may receive signals from the core network, via the core network interface 204, and process the signals for transmission over the RAN, via the RAN interface 220.

In transmitting the signals in the downlink direction, the BBU 208 may dynamically control a connection with one or more distributed antennas to provide desired radio access coverage for one or more UEs. The BBU 208 may receive signals from the core network, via the core network interface 204, and process the signals for transmission to the antenna 202, via the antenna interface 212. In some embodiments, the BBU 208 may also be referred to as, or be implemented in, control circuitry.

The RAN interface 220 may receive the downlink signals from the SPU 200, via the SPU interface 216 and perform downlink front-end processing to facilitate subsequent over-the-air transmissions. The downlink front-end processing operations may include, but are not limited to, conversions (for example, digital-to-analog conversion, up conversion, etc.), amplification (for example, power amplification), etc.

Figure 3:
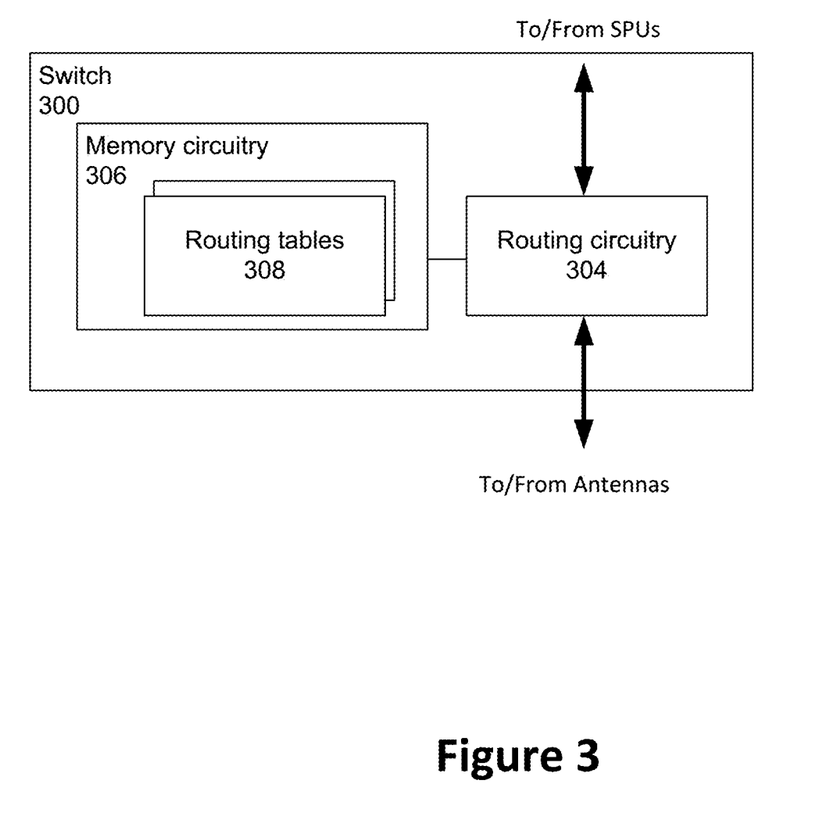
FIG. 3 is a schematic block diagram illustrating a switch in accordance with various embodiments.

FIG. 3 illustrates a switch 300 in accordance with some embodiments. The switch 300 may be similar to, and substantially interchangeable with, any of the switches 108 of FIG. 1.

The switch 300 may include routing circuitry 304 coupled with memory circuitry 306 that includes one or more routing tables 308.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

The routing tables 308 may include configurable indications of a connection topology between BBUs, for example BBUs 104, and antennas, for example, antennas 112. The routing circuitry 304 may receive downlink radio signals from a BBU and convey the downlink radio signals to one or more antennas with which the BBU is connected according to the routing tables 308. Conversely, the routing circuitry 304 may receive uplink radio signals from antennas and convey the uplink radio signals to a BBU with which the antennas are connected according to the routing tables. Each antenna may be connected with only one BBU at a time. Thus, all signals from an antenna will be conveyed to a single BBU for a given configuration of the routing tables 308. The radio signals may, therefore, be transmitted by the switch 300 along dedicated communication channels between the antennas and the BBUs in a circuit-switched manner.

The routing circuitry 304 may also route coordination messages between the BBUs. The coordination messages may be messages transmitted from one BBU to another. These messages may include feedback information, for example, sensing results that convey information about channel conditions between a particular antenna and a UE. These messages may additionally/alternatively include antenna-release requests and responses, status updates, antenna operational parameter queries and responses, etc.

The routing circuitry 304 may also receive configuration signals from a BBU and update configurations of the routing tables based on the configuration signals. In this manner, the dedicated communication channels may be dynamically changed by the BBUs. In some embodiments, the routing circuitry 304 may update a requested configuration of the routing tables 308 only upon receiving a release command from an affected BBU. For example, if BBU 104_1 sends an antenna-release request to BBU 104_2 with respect to antenna 112_3, the routing circuitry 304 may not update the routing table to connect BBU 104_1 with antenna 112_3 until a release command, releasing antenna 112_3, is received from BBU 104_2.

In some embodiments, the routing circuitry 304 may transmit periodic update messages to one or more BBUs with the routing table configuration information. This may enable the other BBUs to have knowledge of which antenna is connected with which BBU. These update messages may be broadcast, multi-cast, or unicast to the BBUs as appropriate.

Figure 4:
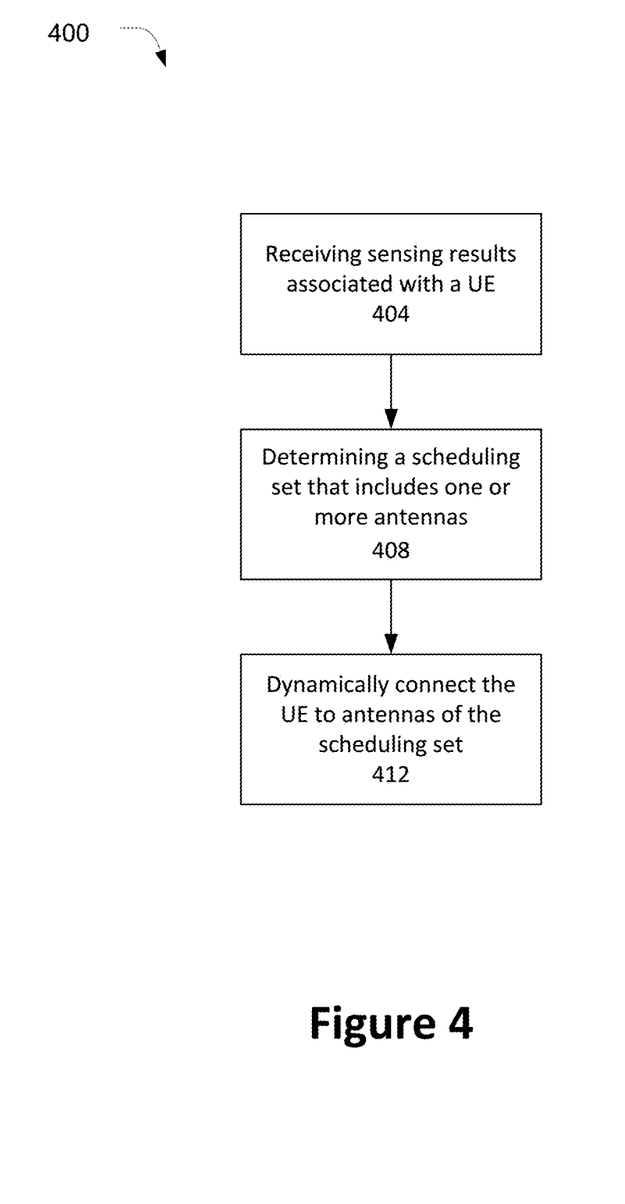
FIG. 4 is a flowchart depicting a dynamic connection operation in accordance with various embodiments.

FIG. 4 is a flowchart depicting a dynamic connection operation 400 in accordance with some embodiments. The dynamic connection operation 400 (hereinafter also referred to as "operation 400") may be performed by a BBU such as, but not limited to, one of the BBUs 104 or BBU 208. For purposes of the present description, the operation 400 may be described as being performed by BBU 104_1, which may be initially connected with UE 116_1 through antennas 112_1 and 112_2.

The operation 400 may include, at 404, receiving sensing results associated with a UE, for example, UE 116_1. The sensing results may be channel quality measurements conducted by the UE 116_1 based on reference signals that are transmitted by one or more of the antennas. The downlink reference signals may include, but are not limited to, cell-specific reference signals, common reference signals, etc. The downlink reference signals transmitted from the antennas may include mechanisms to prevent a UE from sensing the same reference signal from diverse antennas. For example, in some embodiments, the reference signals may be allocated to various cells in a way that neighboring cells are not allowed to share a reference signal with a common format.

The channel quality measurements performed by the UE 116_1 based on the downlink reference signals may be reported from the UE 116_1 directly to the BBU 104_1.

In some embodiments, the sensing results may additionally/alternatively include measurements conducted by the BBU 104_1 based on uplink reference signals, for example, sounding reference signals, transmitted by the UE 116_1 and received through antennas 112_1 and 112_2.

The sensing results may further include measurements conducted by neighboring BBUs. For example, BBU 104_2 may receive the sounding reference signals through the antennas with which it is connected, for example, antennas 112_3-112_5, and transmit the resulting measurements to the BBU 104_1 through switches 108_3 and 108_1.

The sensing results determined by the BBU 104_1 may be expressed as $S_k = \{(i, h_{ik}), (j, h_{jk}), \ldots\}$ where $(i, h_{ik})$ denotes the $i^{th}$ antenna with a long-term channel coefficient of $h_{ik}$ for the $k^{th}$ UE, $(j, h_{jk})$ denotes the $j^{th}$ antenna with a long-term channel coefficient of $h_{jk}$ for the $k^{th}$ UE, etc.

The operation 400 may further include, at 408, determining a scheduling set that includes one or more antennas for a downlink transmission. The determination of the scheduling set may be based on sensing results as well as available antennas.

To determine the scheduling set, the BBU 104_1 may first determine that a plurality of antennas satisfy an antenna-selection criteria based on, for example, the sensing results. In some embodiments, the antenna-selection criteria may be based on comparing the long-term channel coefficient to a predetermined threshold, for example, an antenna may be considered to meet the antenna-selection criteria for sending data to an $m^{th}$ UE if $|h_{im}| > H_{th}$.

The BBU 104_1 may then determine which of the antennas that satisfy the antenna-selection criteria are presently coupled with the BBU 104_1. These may be referred to as first-set antennas.

The BBU 104_1 may also determine which of the antennas that satisfy the antenna-selection criteria are not presently coupled with the BBU 104_1. These may be referred to as second-set antennas. The BBU 104_1 may negotiate with other BBUs that are connected with the second-set antennas in an attempt to have the other BBUs release the second-set antennas so that the BBU 104_1 may connect with the second-set antennas. In some embodiments, negotiating may include the BBU 104_1 sending a request to the BBUs connected with the second-set antennas to request the use of the second-set antennas. The BBUs receiving the requests may then send a response that indicates whether they will allow the BBU 104_1 to use the requested antennas.

In some embodiments, determining whether the plurality of antennas satisfy the antenna-selection criteria may also be based on operational parameters of the antennas themselves. When an antenna is first plugged in, a BBU with which it is connected may determine operational parameters of the antenna. The operational parameters may include, but are not limited to, latency and bandwidth. Latency, as used herein, may refer to the time it takes for digital radio signal data transmitted from an antenna to reach a BBU with which it is connected. Bandwidth, as used herein, may refer to traffic volume of the digital radio signal data delivered from an intended to a connected BBU.

In some embodiments, the antenna-selection criteria may be additionally/alternatively based on comparing the operational parameters of an antenna to predetermined operational-parameter thresholds such as, but not limited to, latency and bandwidth thresholds.

In some embodiments, the BBU 104_1 may determine operational parameters of a particular antenna of interest by sending an antenna operational parameter query to a BBU with which the antenna is connected. The BBU receiving the query may respond with an antenna operational parameter response that provides the requested information, if available.

Antennas not meeting the predetermined operational-parameter thresholds due to, for example, bandwidth constraints or large latencies, may not be available for connection. The BBUs connected with such antennas may be required to mute them because no BBU can use it for coordinated downlink transmission in a current stage and in order to prevent interference with the neighboring cells.

Muting antennas may also save energy consumption of the network. After a downlink transmission has been accomplished by a BBU, it may instruct neighboring BBUs to turn on the muted antennas.

The scheduling set may include the first-set antennas and the antennas of the second-set antennas that are released by the previously coupled BBUs in favor of the requesting BBU.

The operation 400 may further include dynamically connecting with antennas of the scheduling set to provide radio access coverage for the UE at 412. The dynamic connection may be accomplished by appropriately configuring routing tables of the switches 108 to connect the BBU with the antennas of the scheduling set and then transmitting the downlink signal via the antennas of the scheduling set. The BBU may transmit the downlink transmission using a multiuser-multiple input multiple output, beamforming, or space-time coding downlink transmission scheme.

While operation 400 is described with respect to a downlink transmission to one particular UE, other embodiments may perform the operation 400 with respect to a plurality of UEs that are connected to a particular cell or cells of a BBU. In these embodiments, various algorithms may be defined to establish desired coverage for a collective of the UEs. The determination of the desired set of antennas that will provide the desired coverage for a plurality of UEs may be similar to LTE scheduling algorithms such as, but not limited to, proportional fair scheduling, round-robin scheduling, or maximum throughput scheduling.

Figure 5:
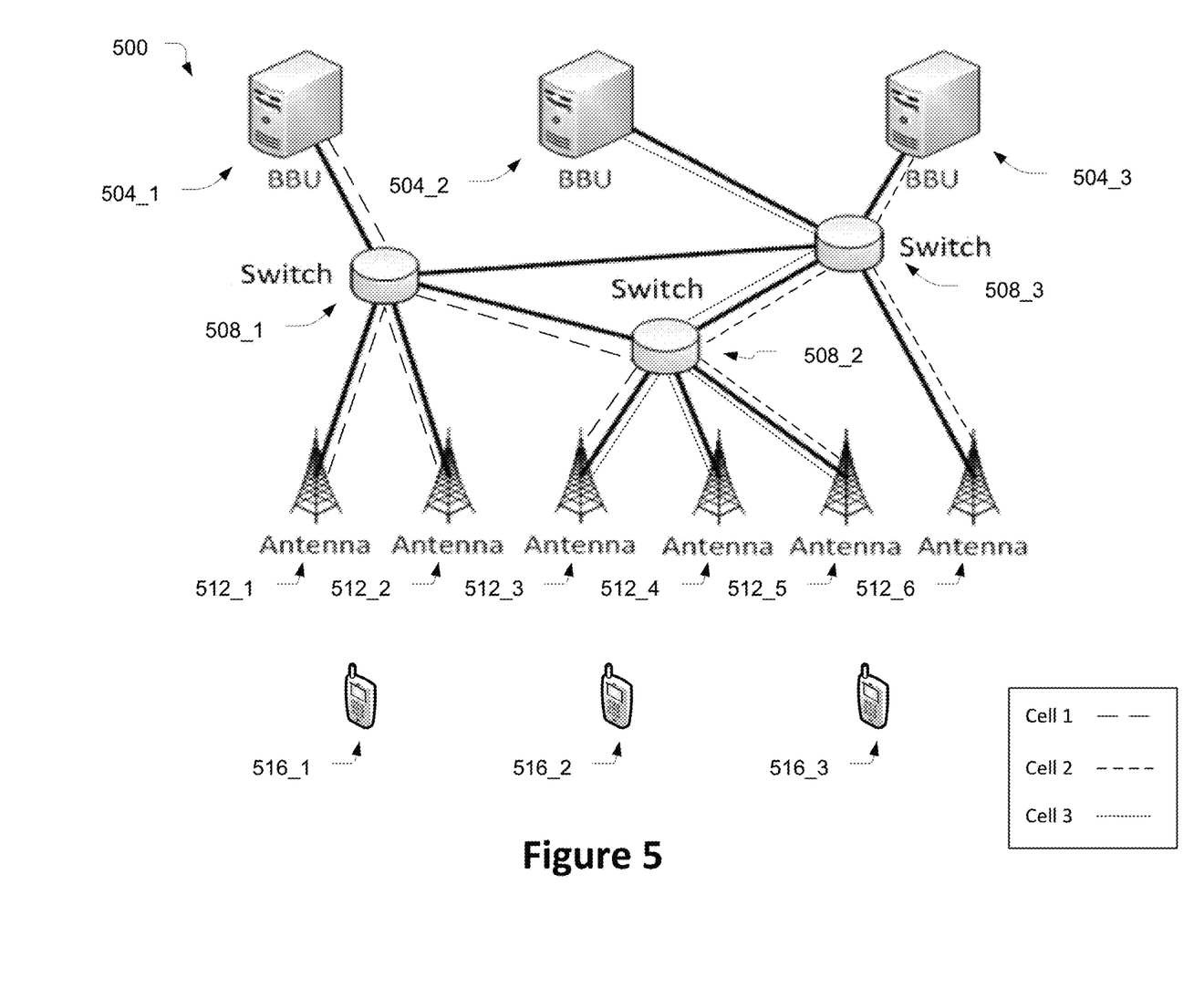
FIG. 5 schematically illustrates a system in accordance with various embodiments.

A dynamic connection operation, similar to operation 400, may be described in further detail with respect to system 500 shown in FIG. 5 in accordance with some embodiments.

The system 500 may include BBUs 504, switches 508, antennas 512, and UEs 516 that may be similar to, and substantially interchangeable with, like-named components described in FIGS. 1 and 2.

An initial connection topology may be as follows. BBU 504_1 may be connected with antennas 512_1 and 512_2; BBU 504_2 may be connected with antennas 512_3-512_5; and BBU 504_3 may be connected with antenna 512_6. The connections of the BBUs 504 with the antennas 512 may be effectuated by configurations of routing tables in the switches 508. For example, a routing table of switch 508_1 may be configured to provide downlink radio signals from BBU 504_1 to antennas 512_1 and 512_2 and to provide uplink radio signals from antennas 512_1 and 512_2 to BBU 504_1, and so forth.

In this example, it is assumed that BBU 504_1 has downlink information to be provided to UE 516_1 and BBU 504_3 has downlink information to be provided to the UE 516_3. BBU 504_1 and BBU 504_3 may each receive sensing results associated with the respective UEs and may determine respective scheduling sets as described above with respect to operation 400. The scheduling set determined by BBU 504_1 for transmission to UE 516_1 may include antennas 512_1-512_4, while the scheduling set determined by BBU 504_3 for transmission to UE 516_3 may include antennas 512_4-512_6.

BBU 504_1 may determine that its first-set antennas include antennas 512_1 and 512_2 and its second-set antennas include antennas 512_3 and 512_4. The BBU 504_1 may know, based on previously provided connection topology information, that antennas 512_3 and 512_4 are connected with BBU 504_2. Therefore, the BBU 504_1 may send an antenna-release request to the BBU 504_2 requesting the release of antennas 512_3 and 512_4.

Similarly, the BBU 504_3 may determine its first-set antennas include antenna 512_6 and its second-set antennas include antennas 512_4 and 512_5. The BBU 504_3 may know, based on previously provided connection topology information, that antennas 512_4 and 512_5 are connected with BBU 504_2. Therefore, the BBU 504_3 may send an antenna release request to the BBU 504_2 requesting the release of antennas 512_4 and 512_5.

In this example, antenna 512_4 may be unavailable for both BBU 504_1 and BBU 504_3 due to a constraint network bandwidth. Therefore, BBU 504_2 may mute antenna 512_4, release its connection with antenna 512_3 in favor of BBU 504_1, and release its connection with antenna 512_5 in favor of BBU 504_3. In some embodiments, the BBU 504_2 may release its connections with antennas 512_3 and 512_5 by sending a release command to switches 508_2 and 508_3. Having released its two available antennas and muted its third unavailable antenna, the BBU 504_2 may not be able to schedule downlink transmissions for UEs attached to the BBU 504_2. In some embodiments, the BBU 504_2 may determine whether or not to release its connection with at least one antenna based on the nature (for example, quality of service requirements) and volume of downlink traffic that it has to send.

The BBU 504_1 may configure its scheduling set to include antenna 512_3 by updating the routing tables in switches 508_1 and 508_2. Similarly, the BBU 504_3 may configure its scheduling set to include antenna 512_6 by updating the routing table in switch 508_3. With the switches 508 appropriately configured, the BBU 504_1 may provide a first cell, for example, cell 1, having UEs associated with the BBU 504_1 (or at least those UEs that have downlink transmissions scheduled) in its center. Similarly, the BBU 504_3 may provide, for example, cell 2, having UEs associated with the BBU 504_3 (or at least those UEs that have downlink transmissions scheduled) in its center.

After the BBU 504_1 and the BBU 504_3 accomplish their downlink transmissions, the BBU 504_2 may be notified to un-mute antenna 512_4. If the BBU 504_2 determines that its scheduling set includes antennas 512_3-512_6, it may send an antenna release request to BBUs 504_1 and 504_3 to release antennas 512_3 and 512_5, respectively. Antenna 512_6 may, however, be detected to have a latency exceeding the threshold to the BBU 504_2, which may trigger a notification of muting it from BBU 504_2 to BBU 504_3. Therefore, the BBU 504_2 may build a cell, for example, cell 3, having UEs associated with the BBU 504_2 (or at least those having downlink transmissions scheduled) at its center. The BBU 504_2 may then start to transmit scheduled downlink communications to its UEs.

Figure 6:
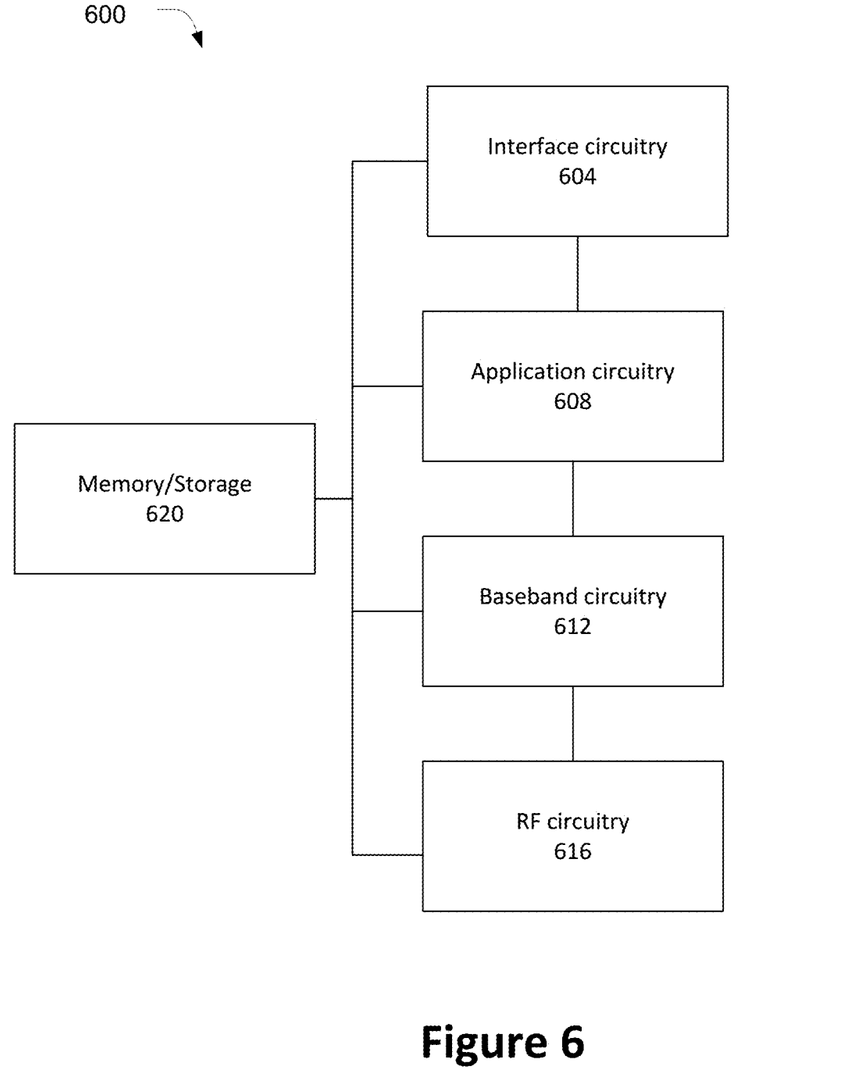
FIG. 6 illustrates a computing apparatus incorporating aspects of the present disclosure in accordance with various embodiments.

An SPU, for example, SPU 200, or an antenna, for example, antenna 202 may be implemented into a system using any suitably configured hardware and/or software. FIG. 6 illustrates, for one embodiment, an example system 600 comprising interface circuitry 604, application circuitry 608, baseband circuitry 612, RF circuitry 616, and memory/storage 620, coupled with each other at least as shown.

The application circuitry 608 may include circuitry such as, but not limited to, one or more single-core or multi-core processors. The processor(s) may include any combination of general-purpose processors and dedicated processors (for example, graphics processors, application processors, etc.). The application circuitry 608 may be coupled with memory/storage 620 and configured to execute instructions stored in the memory/storage to enable various applications and/or operating systems running on the system.

The baseband circuitry 612 may include circuitry such as, but not limited to, one or more single-core or multi-core processors. The processor(s) may include one or more baseband processors, digital signal processors, application specific integrated circuits (ASICs), field programmable gate arrays (FPGAs), etc. The baseband circuitry 612 may be coupled with memory/storage 620 and configured to execute instructions stored in the memory/storage 620 to implement a BBU, for example, BBU 208, to handle various radio control functions that enable communication with one or more radio networks via the RF circuitry 616. The radio control functions may include, but are not limited to, signal modulation, encoding, decoding, radio frequency shifting, etc. In some embodiments, the baseband circuitry 612 may implement a BBU to provide one or more operations described above with respect to the dynamic connection operation 400.

In various embodiments, baseband circuitry 612 may include circuitry to operate with signals that are not strictly considered as being in a baseband frequency. For example, in some embodiments, baseband circuitry 612 may include circuitry to operate with signals having an intermediate frequency, which is between a baseband frequency and a radio frequency.

In some embodiments in which the system 600 is an antenna, the system 600 may not include baseband circuitry 612.

The RF circuitry 616 may enable communication with wireless networks using modulated electromagnetic radiation through a non-solid medium. In various embodiments, the RF circuitry 616 may implement an RF interface, such as RAN interface 220. The RF circuitry 616 may include switches, filters, amplifiers, etc. to facilitate the communication with the wireless network.

In various embodiments, RF circuitry 616 may include circuitry to operate with signals that are not strictly considered as being in a radio frequency. For example, in some embodiments, RF circuitry 616 may include circuitry to operate with signals having an intermediate frequency, which is between a baseband frequency and a radio frequency.

In some embodiments in which the system 600 is an SPU, the system 600 may not include RF circuitry 616.

The interface circuitry 604 may enable communication with components of one or more other networks such as a core network using appropriate network protocols. The interface circuitry 604 may implement a core network interface, for example, core network interface 204.

In some embodiments, some or all of the constituent components of the interface circuitry 604, application circuitry 608, baseband circuitry 612, RF circuitry 616, and/or the memory/storage 620 may be implemented together on a system on a chip (SOC).

Memory/storage 620 may be used to load and store data and/or instructions, for example, for system 600. Memory/storage for one embodiment may include any combination of suitable volatile memory (e.g., dynamic random access memory (DRAM)) and/or non-volatile memory (e.g., Flash memory).

Figure 7:
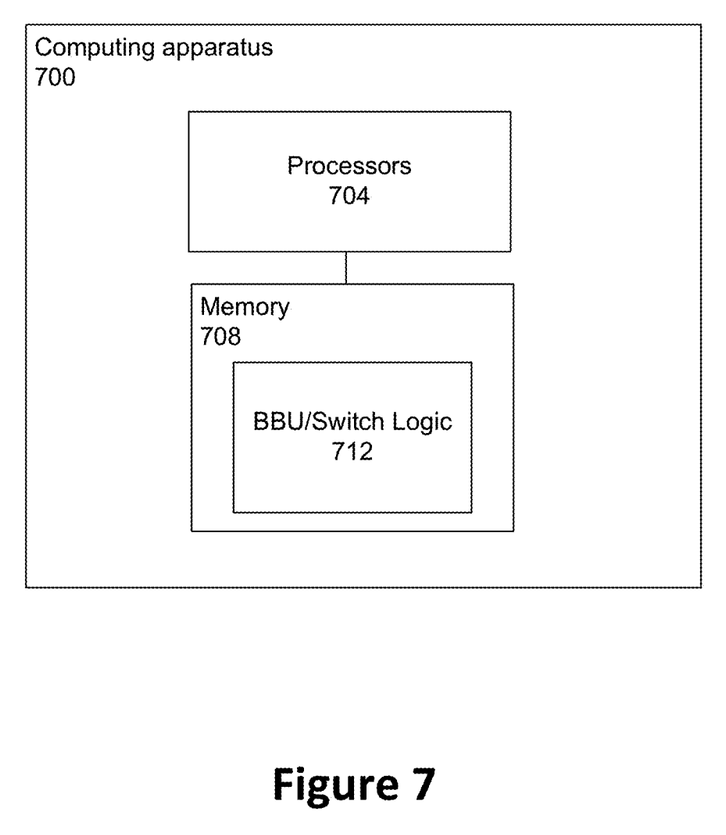
FIG. 7 illustrates a computing apparatus in accordance with various embodiments.

FIG. 7 illustrates a computing apparatus 700 incorporating aspects of the present disclosure in accordance with various embodiments. In various embodiments, the computing apparatus 700 may be employed to implement various embodiments of the present disclosure. As shown, the computing apparatus 700 may include memory 708 where BBU/switch logic 712 may be configured to practice embodiments of or aspects of embodiments of any one of the processes described herein. The memory 708 may represent a broad range of persistent storage media known in the art, including but not limited to flash memory, dynamic random access memory, static random access memory, an optical disk, a magnetic disk, etc. In embodiments, the memory 708 may include one or more computer-readable non-transitory storage media. In other embodiments, memory 708 may be transitory, such as signals, encoded with BBU/switch logic 712.

In various embodiments, the BBU/switch logic 712 may enable an apparatus, for example, the computing apparatus 700, in response to its execution by one or more processors 704, to perform various operations described herein. As an example, BBU/switch logic 712 may include instructions 712 configured to cause an apparatus, for example, SPU 200 or switch 300, to provide the dynamic connection and routing operations described herein.

The following paragraphs describe examples of various embodiments.

Example 1 includes an apparatus comprising: memory having instructions; and one or more processors coupled with the memory to execute the instructions to provide a baseband unit (BBU) to: receive sensing results associated with a user equipment (UE); determine, based on the sensing results, a scheduling set that includes one or more antennas selected from a plurality of distributed antennas; and dynamically connect with the one or more antennas of the scheduling set to provide radio access coverage for the UE.

Example 2 includes the apparatus of Example 1, wherein the BBU is a first BBU to: detect that a first antenna of the plurality of distributed antennas is connected with a second BBU; send a request to the second BBU to request usage of the first antenna; receive a response that indicates whether the second BBU allows the first BBU to use the first antenna; and include the first antenna in or exclude the first antenna from the scheduling set based on the response.

Example 3 includes the apparatus of any one of Examples 1-2, wherein the selected one or more antennas comprises a plurality of antennas and wherein the BBU is configured to transmit a downlink transmission to the UE using the plurality of antennas.

Example 4 includes the apparatus of Example 3, wherein the BBU is configured to transmit the downlink transmission using a multiuser-multiple input, multiple output (MU-MIMO), beamforming, or space-time coding downlink transmission scheme.

Example 5 includes the apparatus of any one of Examples 1-4, wherein the BBU is a first BBU and is configured to receive sensing results from a second BBU.

Example 6 includes the apparatus of any one of Examples 1-5, wherein the BBU is to determine if a first antenna is unavailable, and to send a request to mute the first antenna if the first antenna is unavailable.

Example 7 includes the apparatus of Example 6, wherein the BBU is a first BBU and is to: send a query to a second BBU connected with the first antenna to request an operational parameter associated with the first antenna; receive a response from the second BBU with the operational parameter; and determine if the first antenna is unavailable based on a comparison of the operational parameter to a predetermined threshold.

Example 8 includes the apparatus of Example 7, wherein the operational parameter is a bandwidth parameter or a latency parameter.

Example 9 includes the apparatus of any one of Examples 1-8, wherein the BBU is to configure one or more routing tables in one or more corresponding switches to dynamically connect the UE to the one or more antennas of the scheduling set.

Example 10 includes a switch comprising: memory circuitry to store a routing table that includes a configurable indication of a connection topology between a baseband unit (BBU) and one or more antennas; and routing circuitry, coupled with the memory circuitry, to receive downlink radio signals from the baseband unit and to transmit the downlink signals to the one or more antennas based on the connection topology.

Example 11 includes the switch of Example 10, wherein the BBU is a first BBU and the routing circuitry is further to route coordination messages between the first BBU and a second BBU.

Example 12 includes the switch of Example 11, wherein the coordination messages include sensing results, an antenna-release request, an antenna-release response, or a status update.

Example 13 includes the switch of Example 11, wherein the coordination messages include an antenna operational parameter query and an antenna operational parameter response.

Example 14 includes the switch of any one of Examples 10-13, wherein the routing circuitry is to receive a configuration signal from the BBU and to update the connection topology based on the configuration signal.

Example 15 includes a signal processing unit (SPU) comprising: an antenna interface to send signals to and to receive signals from one or more antennas; and a baseband unit (BBU), coupled with the antenna interface, to receive sensing results associated with a user equipment (UE); determine, based on the sensing results, a scheduling set that includes one or more antennas selected from a plurality of distributed antennas; and transmit control signals, via the antenna interface, to one or more switches to configure one or more routing tables to connect the BBU with the one or more antennas of the scheduling set.

Example 16 includes the SPU of Example 15, wherein the BBU is a first BBU to: detect that a first antenna of the plurality of distributed antennas is connected with a second BBU; send a request to the second BBU to request usage of the first antenna; receive a response that indicates whether the second BBU allows the first BBU to use the first antenna; and include the first antenna in or exclude the first antenna from the scheduling set based on the response.

Example 17 includes the SPU of any one of Examples 15-16, wherein the selected one or more antennas comprises a plurality of antennas and the BBU is to transmit a downlink transmission, via the antenna interface, to the UE using the plurality of antennas.

Example 18 includes the SPU of any one of Examples 15-17, wherein the BBU is a first BBU and is to receive sensing results from a second BBU.

Example 19 includes the SPU of any one of Examples 15-18, wherein the BBU is to determine if a first antenna is unavailable, and to send a request to mute the first antenna if the first antenna is unavailable.

Example 20 includes the SPU of Example 19, wherein the BBU is a first BBU and is to: send a query to a second BBU connected with the first antenna to request an operational parameter associated with the first antenna; receive a response from the second BBU with the operational parameter; and determine the first antenna is unavailable based on a comparison of the operational parameter to a predetermined threshold.

Example 21 includes the SPU of Example 20, wherein the operational parameter is a bandwidth parameter or a latency parameter.

Example 22 includes the SPU of any one of Examples 15-21, wherein the BBU is to transmit the control signals to configure the one or more routing tables to dynamically connect the UE to the one or more antennas of the scheduling set.

Example 23 includes a method of operating a baseband unit (BBU), the method comprising: receiving sensing results associated with a user equipment (UE); determining, based on the sensing results, a scheduling set that includes one or more antennas selected from a plurality of distributed antennas; and dynamically connecting with the one or more antennas of the scheduling set to provide radio access coverage for the UE.

Example 24 includes the method of Example 23, wherein the BBU is a first BBU and the method further comprises: determining that a first antenna of the plurality of distributed antennas is connected with a second BBU; sending a request to the second BBU to request usage of the first antenna; receiving a response that indicates whether the second BBU will allow the first BBU to use the first antenna; and including the first antenna in or exclude the first antenna from the selected one or more antennas based on the response.

Example 25 includes the method of any one of Examples 23-24, wherein the selected one or more antennas comprises a plurality of antennas and the method further comprises transmitting a downlink transmission to the UE using the plurality of antennas.

Example 26 includes the method of Example 25, further comprising transmitting the downlink transmission using a multiuser-multiple input, multiple output (MU-MIMO), beamforming, or space-time coding downlink transmission scheme.

Example 27 includes the method of any one of Examples 23-26, wherein the BBU is a first BBU and is to receive sensing results from a second BBU.

Example 28 includes the method of any one of Examples 23-27, further comprising: determining a first antenna is unavailable; and sending a request to mute the first antenna based on said determination the first antenna is unavailable.

Example 29 includes the method of Example 28, wherein the BBU is a first BBU and the method further comprises: sending a query to a second BBU connected with the first antenna to request an operational parameter associated with the first antenna; receiving a response from the second BBU with the operational parameter; and determining the first antenna is unavailable based on a comparison of the operational parameter to a predetermined threshold.

Example 30 includes the method of Example 29, wherein the operational parameter is a bandwidth parameter or a latency parameter.

Example 31 includes the method of any one of Examples 23-30, further comprising configuring one or more routing tables in one or more corresponding switches to dynamically connect the UE to the one or more antennas of the scheduling set.

Example 32 includes a method of operating a switch, the method comprising: storing a routing table that includes a configurable indication of a connection topology between a baseband unit (BBU) and one or more antennas; receiving downlink radio signals from the baseband unit; and transmitting the downlink signals to the one or more antennas based on the connection topology.

Example 33 includes the method of Example 32, wherein the BBU is a first BBU and the method further comprises routing coordination messages between the first BBU and a second BBU.

Example 34 includes the method of Example 33, wherein the coordination messages include sensing results, an antenna-release request, an antenna-release response, or a status update.

Example 35 includes the method of Example 33, wherein the coordination messages include an antenna operational parameter query and an antenna operational parameter response.

Example 36 includes the method of any one of Examples 32-35, further comprising: receiving receive a configuration signal from the BBU; and updating the connection topology based on the configuration signal.

Example 37 includes a method of operating a baseband unit (BBU), the method comprising: receiving sensing results associated with a user equipment (UE); determining, based on the sensing results, a scheduling set that includes one or more antennas selected from a plurality of distributed antennas; and transmitting control signals to one or more switches to configure one or more routing tables to connect the BBU with the one or more antennas of the scheduling set.

Example 38 includes the method of Example 37, wherein the BBU is a first BBU and the method further comprises: determining that a first antenna of the plurality of distributed antennas is connected with a second BBU; sending a request to the second video to request usage of the first antenna; receiving a response that indicates whether the second BBU will allow the first BBU to use the first antenna; and including the first antenna in or exclude the first antenna from the selected one or more antennas based on the response.

Example 39 includes the method of any one of Examples 37 or 38, wherein the selected one or more antennas comprises a plurality of antennas and the method further comprises transmitting a downlink transmission, via the antenna interface, to the UE using the plurality of antennas.

Example 40 includes the method of any one of Examples 37-39, wherein the BBU is a first BBU and the method further comprises receiving sensing results from a second BBU.

Example 41 includes the method of any one of Examples 37-40, further comprising determining a first antenna is unavailable, and sending a request to mute the first antenna based on said determination the first antenna is unavailable.

Example 42 includes the method of any one of Examples 41, wherein the BBU is a first BBU and the method further comprises: sending a query to a second BBU connected with the first antenna to request an operational parameter associated with the first antenna; receiving a response from the second BBU with the operational parameter; and determining the first antenna is unavailable based on a comparison of the operational parameter to a predetermined threshold.

Example 43 includes the method of Example 42, wherein the operational parameter is a bandwidth parameter or a latency parameter.

Example 44 includes the method of any one of Examples 37-43, further comprising transmitting the control signals to configure the one or more routing tables to dynamically connect the UE to the one or more antennas of the scheduling set.

Example 45 includes one or more computer readable media having instructions that, when executed, cause a device to perform any one of the methods of Examples 23-44.

Example 46 includes an apparatus comprising means to perform any one of the methods of Examples 23-24.

The description herein of illustrated implementations, including what is described in the Abstract, is not intended to be exhaustive or to limit the present disclosure to the precise forms disclosed. While specific implementations and examples are described herein for illustrative purposes, a variety of alternate and/or equivalent embodiments or implementations calculated to achieve the same purposes may be made in light of the above detailed description, without departing from the scope of the present disclosure, as those skilled in the relevant art will recognize.

What is claimed is:

1. One or more non-transitory, computer-readable media having instructions that, when executed by one or more processors, cause a first baseband unit (BBU) to:
    identify, based on sensing information associated with a user equipment (UE), a plurality of distributed antennas to provide a radio access to the UE by the first BBU;
    determine that a second BBU is connected with a first antenna of the plurality of distributed antennas identified for the radio access to the UE;
    send a query to the second BBU for information corresponding to at least one operational parameter associated with the first antenna;
    receive, from the second BBU, a response including the information corresponding to the at least one operational parameter associated with the first antenna;
    compare the at least one operational parameter associated with the first antenna to a respective threshold;
    in response to the comparison, determine whether to retain the first antenna in plurality of distributed antennas identified for the radio access to the UE by the first BBU;
    upon determining to retain the first antenna in the plurality of distributed antennas identified for the radio access to the UE by the first BBU, send a request to the second BBU to release its connection to the first antenna;
    receiving a response from the second BBU indicating whether the second BBU is to release its connection to the first antenna; and
    based at least on the response, determine whether to include the first antenna in the plurality of distributed antennas to provide the radio access to the UE by the first BBU.

2. The one or more non-transitory, computer-readable media of claim 1, wherein the instructions, when executed, further cause the first BBU to:
    transmit a downlink transmission to the UE using the one or more antennas.

3. The one or more non-transitory, computer-readable media of claim 2, wherein the downlink transmission is a multiuser-multiple input, multiple output (MU-MIMO), beamforming, or space-time coding downlink transmission.

4. The one or more non-transitory, computer-readable media of claim 1, wherein the response from the second BBU indicates that the second BBU is to release its connection to the first antenna and the plurality of distributed antennas includes the first antenna.

5. The one or more non-transitory, computer-readable media of claim 1, wherein the first BBU is to cause the second BBU to mute the first antenna and the plurality of distributed antennas does not include the first antenna.

6. The one or more non-transitory, computer-readable media of claim 5, wherein the instructions, when executed, further cause the first BBU to:
  determine that the first antenna is unavailable due to a bandwidth constraint or latency associated with the first antenna; and
  cause the second BBU to mute the first antenna based on the determination that the first antenna is unavailable.

7. The one or more non-transitory, computer-readable media of claim 1, wherein to connect with the one or more antennas the first BBU is to:
  update configurations of one or more routing tables respectively disposed in one or more switches.

8. One or more non-transitory, computer-readable media having instructions that, when executed by one or more processors, cause a first baseband unit (BBU) to:
  identify, based on sensing information associated with a user equipment (UE), a plurality of distributed antennas to provide a radio access to the UE by the first BBU;
  determine that a second BBU is connected to a first antenna of the plurality of distributed antennas identified for the radio access to the UE;
  send a request to the second BBU to release the connection of the second BBU with the first antenna;
  receive, from the second BBU, a response indicating whether that the second BBU will not release the connection of the second BBU with the first antenna;
  upon receiving the response from the second BBU:
    remove the first antenna from a scheduling set of one or more antennas of the plurality of distributed antennas to provide the radio access to the UE by the first BBU; and
    dynamically connect with the scheduling set of the one or more antennas excluding the first antenna to provide radio access coverage for the UE.

9. The one or more non-transitory, computer-readable media of claim 8, wherein the first BBU is further to:
  send a request to the second BBU to mute the first antenna, wherein muting the first antenna includes preventing the first antenna from coordinated downlink transmission during a duration of providing the radio access to the UE.

10. The one or more non-transitory, computer-readable media of claim 9, wherein the first BBU is to:
  send a query to the second BBU connected with the first antenna to request an operational parameter associated with the first antenna;
  receive a response from the second BBU with the operational parameter; and
  determine the first antenna is unavailable based on a comparison of the operational parameter to a predetermined threshold.

11. The one or more non-transitory, computer-readable media of claim 10, wherein the operational parameter is a bandwidth parameter or a latency parameter.

12. The one or more non-transitory, computer-readable media of claim 8, wherein to dynamically connect with the scheduling set of the one or more antennas, the first BBU is to transmit configuration messages to one or more switches to update routing tables in one or more corresponding switches to dynamically connect the UE to the one or more antennas of the scheduling set.

13. An apparatus to implement a first baseband unit (BBU), the apparatus comprising:
  an interface to send signals to, and to receive signals from, a plurality of distributed antennas via one or more switches; and
  processing circuitry, coupled with the interface, to:
    determine, based on sensing information associated with a user equipment (UE), a scheduling set of one or more antennas selected from the plurality of distributed antennas to provide a radio access to the UE by the first BBU;
    determine that a second BBU is connected with a first antenna in the scheduling set of the one or more antennas selected for the radio access to the UE;
    send a query to the second BBU for information corresponding to at least one of latency or bandwidth associated with the first antenna;
    receive, from the second BBU, a response including the information corresponding to at least one of the latency or the bandwidth associated with the first antenna;
    determine at least one of the latency or the bandwidth associated with the first antenna based at least on the information included in the response received from the second BBU;
    compare the determined latency or the bandwidth associated with the first antenna to a respective predetermined latency threshold or a bandwidth threshold;
    in response to the comparison, determine retaining the first antenna in the scheduling set of the one or more antennas selected for the radio access to the UE by the first BBU; and
    configure one or more switches to connect the first BBU with the one or more antennas of the scheduling set to provide the radio access to the UE by the first BBU.

14. The apparatus of claim 13, wherein the processing circuitry is to:
  send a request to the second BBU to request that the second BBU release its connection with the first antenna or mute the first antenna;
  receive a response that indicates whether the second BBU is to release its connection with the first antenna or mute the first antenna; and
  include the first antenna in or exclude the first antenna from the scheduling set based on the response.

15. The apparatus of claim 14, wherein the processing circuitry is to receive sensing information from the second BBU.

16. The apparatus of claim 13, wherein the processing circuitry is to transmit a downlink transmission, via the interface, to the UE using the one or more antennas of the scheduling set.

17. The apparatus of claim 13, wherein the processing circuitry is to:
  determine that the first antenna is unavailable due to a bandwidth constraint or latency associated with the first antenna; and
  send a request to the second BBU to mute the first antenna based on the determination that the first antenna is unavailable.

18. The apparatus of claim 13, wherein the processing circuitry is to determine the scheduling set to provide a plurality of antennas to create a cell having a center in which the UE is disposed.

19. An apparatus to implement a first baseband unit (BBU) in a wireless communications system, the apparatus comprising:
  an interface to send signals to, and to receive signals from, a plurality of distributed antennas via one or more switches; and
  processing circuitry, coupled with the interface, to:

identify, based on sensing information associated with a user equipment (UE), a plurality of distributed antennas to provide a radio access to the UE by the first BBU;

determine that a second BBU is connected to a first antenna of the plurality of distributed antennas identified for the radio access to the UE;

send a request to the second BBU to release the connection of the second BBU with the first antenna;

receive, from the second BBU, a response indicating that the second BBU will not release the connection of the second BBU with the first antenna;

upon receiving the response from the second BBU:
  remove the first antenna from a scheduling set of one or more antennas of the plurality of distributed antennas to provide the radio access to the UE by the first BBU; and
  dynamically connect with the scheduling set of the one or more antennas excluding the first antenna to provide radio access coverage for the UE.

20. The apparatus of claim 19, wherein the first BBU is further to:

send a request to the second BBU to mute the first antenna, wherein muting the first antenna includes preventing the first antenna from coordinated downlink transmission during a duration of providing the radio access to the UE.

21. The apparatus of claim 20, wherein the first BBU is to:

send a query to the second BBU connected with the first antenna to request an operational parameter associated with the first antenna;

receive a response from the second BBU with the operational parameter; and determine the first antenna is unavailable based on a comparison of the operational parameter to a predetermined threshold.

22. The apparatus of claim 21, wherein the operational parameter is a bandwidth parameter or a latency parameter.

23. The apparatus of claim 19, wherein to dynamically connect with the scheduling set of the one or more antennas, the first BBU is to transmit configuration messages to one or more switches to update routing tables in one or more corresponding switches to dynamically connect the UE to the one or more antennas of the scheduling set.

* * * * *

UNITED STATES PATENT AND TRADEMARK OFFICE
CERTIFICATE OF CORRECTION

| | |
|---|---|
| PATENT NO. | : 11,277,771 B2 |
| APPLICATION NO. | : 16/552897 |
| DATED | : March 15, 2022 |
| INVENTOR(S) | : Yifan Yu, Sunny Zhang and Guangjie Li |

It is certified that error appears in the above-identified patent and that said Letters Patent is hereby corrected as shown below:

In the Claims

Column 15, Line 26, In Claim 8, delete "whether that" and insert -- that --.

Signed and Sealed this
Seventh Day of June, 2022

Katherine Kelly Vidal
Director of the United States Patent and Trademark Office